Figures 1, 2, 3, 4:
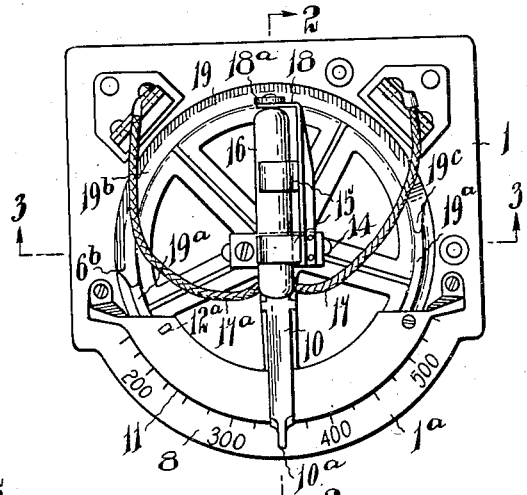

Sept. 4, 1934.  E. S. SMITH  1,972,168

TEMPERATURE INDICATOR AND CONTROL

Filed Sept. 14, 1932

Inventor
E. S. Smith
By J. Edw. Maybee
ATTY.

Patented Sept. 4, 1934

1,972,168

UNITED STATES PATENT OFFICE 1,972,168

TEMPERATURE INDICATOR AND CONTROL

Elmore S. Smith, Weston, Ontario, Canada, assignor to Moffats Limited, Weston, Ontario, Canada Application September 14, 1932, Serial No. 633,131
In Canada May 4, 1932

3 Claims. (Cl. 200—138)

This invention relates to apparatus for indicating and controlling temperatures, particularly the temperatures of electric stove ovens, in which the current to the heating element or elements thereof is automatically turned off and on to maintain the oven at a predetermined temperature and in which the temperature is indicated at all times. The object of the present invention is to provide a simple and rugged device of this character in which the number of parts are reduced to a minimum and in which regulation is readily effected.

I attain my objects by providing a thermostatically controlled temperature indicator having a cam track on which an anti-friction roller runs. This roller is carried by a switch carrier which is tiltably mounted on a regulator. Preferably a make and break mercury switch is employed, the switch being closed when in a horizontal position and open in a tilted position. The positions of the switch are controlled respectively by the low and high portions of the cam track. By moving the regulator, the distance between the high portion of the cam track and the anti-friction wheel on the switch carrier is varied to vary the amount of travel of the indicator relative to the regulator before the switch is opened. The oven is maintained at the temperature set by the regulator by the to and fro movement of the high cam portion on the indicator relative to the roller on the switch carrier whereby a slight drop in temperature will cause the switch to be closed and a corresponding rise in temperature will again open the switch.

The constructions are hereinafter more fully described and are illustrated in the accompanying drawing in which:

Fig. 1 is a plan view of my apparatus, the cover being removed;

Fig. 2 a vertical section on the line 2—2 in Fig. 1;

Fig. 3 a cross section on the line 3—3 in Fig. 1; and

Fig. 4 a detail in end elevation of the switch carrier and cam track.

In the drawing like numerals of reference indicate corresponding parts in the different figures.

1 is a base plate the underside of which is provided with a boss 2 in which is secured a tube 3. A spindle 4 passes through the tube and boss and is journalled therein in any suitable manner. One end of a bi-metallic thermostatic coil 5 disposed on the spindle is secured to the lower end thereof and the other end of the coil is secured to the adjacent end of the tube 3. To the other end of the spindle 4 above the plate 1 is secured an indicator 6 which is formed as a wheel or disk having a hub $6^a$ in which is threaded a grub screw 7 for engagement with the spindle. The front of the base plate is curved at $1^a$ concentric to the indicator and this curved portion $1^a$ is also inclined and provided with a dial 8 which is graduated with the degrees of heat for which the apparatus is rated. A pointer $6^b$ formed by colouring the periphery of the indicator in contrasting colours co-acts with the dial to indicate the temperature of the chamber or oven 9 in which the thermostatic coil 5 is placed. The base plate 1 is secured to the top of the oven at the back thereof in any suitable manner.

On the upper end of the spindle 3 is journalled a regulator 10 which is extended radially over an arc shaped support 11 and is provided with an index finger $10^a$ positioned above the dial 8. A friction device, formed by a flat spring arm 12 secured to the underside of the regulator, engages the underside of the support 11. A projection $12^a$ formed on the support is adapted to engage the spring arm to limit the movement of the regulator in one direction of travel. A switch carrier 13 journalled by means of trunnions 14 on the regulator is provided with clips 15 for receiving a mercury switch 16 of known construction. This type of switch comprises two contacts adapted to be electrically connected by a globule of mercury when the switch is in a horizontal position. When the switch is tilted the mercury runs to one end and thus breaks the connection between the contacts. These contacts are connected in a wire 17, $17^a$ of a circuit for supplying electrical energy to the heating element or elements of the oven.

The carrier 13 is provided with a leg 18 having an anti-friction roller $18^a$ journalled thereon for engagement with a cam track 19 on the indicator 6. The cam track has a high portion $19^a$ and a low portion $19^b$, the latter being formed by the upper surface of the indicator. An inclined face $19^c$ on the cam track facilitates the travel of the high portion $19^a$ beneath the roller $18^a$ which causes the switch to be tilted to its open position.

Assuming the switch 16 to be in its normally closed position with the roller $18^a$ engaging the low portion $19^b$ of the cam track, the mode of operation is as follows. The index finger $10^a$ of the regulator 10 is turned to the degree of heat marked on the dial 8 which it is desired to maintain. When the main switch (not shown) of the circuit (including the wire 17, $17^a$) for supplying current to the heating element or elements in the oven is closed, the rise in temperature causes the thermostatic coil 5 to turn the spindle 4 and thus the indicator 6 whereupon the pointer 6b moves across the dial 8 towards the index finger 10a, and the inclined face 19c moves towards the anti-friction roller 18a. As the pointer 6b nears the regulator index finger 10a the inclined face 19c passes under the roller 18a and, when the pointer 6b registers with the index finger 10a, the high portion 19a of the cam track 19 engages the roller 18a to tilt the mercury switch 16 to its open position. The current is thus cut off independently of the main switch and as the temperature of the oven drops slightly the direction of rotation of the indicator 6 is reversed whereby the roller 18a travels down the inclined face 19c to cause the mercury switch to be closed again. The switch is thus alternately opened and closed to maintain the oven at the desired temperature.

Referring to Fig. 1 it will be noted that as the regulator index finger 10a is moved either towards the low or the high figures on the dial 8, the leg 18 and its roller 18a are moved towards and away from the inclined face 19c respectively. The amount of travel of the inclined face 19b relative to the roller 18a is thus varied directly in proportion to the travel of the pointer 6b relative to the regulator index finger 10a.

The high portion 19a of the cam track 19 subtends an arc of substantially 180° so that the apparatus may be immediately set to maintain the oven at a desired temperature lower than the temperature to which it had been originally raised.

What I claim as my invention is:

1. A temperature indicator and control comprising a rotatable spindle; thermostatic means for controlling the rotary movements of the spindle; a disk secured to the spindle; indicating means comprising a pointer carried by the disk and a dial; a cam track on said disk; a regulator journalled on said spindle; a normally closed fluid contact switch; and a carrier for said switch pivoted directly on the regulator to tilt relative thereto, the switch carrier being engaged directly by the cam track to cause it to open the switch, the regulator being adapted to move the switch carrier relative to the cam track so that the extent of movement of the cam track relative to the carrier necessary to cause the switch to open or close may be varied.

2. A temperature indicator and control comprising a rotatable spindle; thermostatic means for controlling the rotary movements of the spindle; a disk secured to the spindle; indicating means comprising a pointer carried by the disk and a dial; a cam track on said disk; a regulator journalled on said spindle; a normally closed fluid contact switch; a carrier for said switch pivoted at one end thereof directly on the regulator to tilt relative thereto, the switch carrier having a leg on the end thereof remote from that pivoted on the regulator; and an anti-friction roller carried by said leg for direct engagement with the cam track to cause it to open the switch, the regulator being adapted to move the switch carrier and roller relative to the cam track so that the extent of movement of the cam track relative to the roller necessary to cause the switch to open or close may be varied.

3. A temperature indicator and control comprising a rotatable spindle; thermostatic means for controlling the rotary movements of the spindle; a disk secured to the spindle; indicating means comprising a pointer carried by the disk and a dial; a cam track on said disk concentric to the axis of the spindle; a regulator journalled on said spindle; trunnions carried by said regulator, the axis of the trunnions intersecting the axis of the spindle; a carrier mounted on said trunnions to tilt relative to the regulator; and a fluid contact switch supported by said carrier, the latter being engaged directly by the cam track to cause it to open and close the switch, the trunnions being adapted to revolve the switch carrier with the regulator on its axis around the cam track so that the extent of movement of the latter relative to the carrier may be varied to adjust the opening and closing of the switch.

ELMORE S. SMITH.